United States Patent
Ukai et al.

(10) Patent No.: US 9,090,464 B2
(45) Date of Patent: Jul. 28, 2015

(54) HYDROGEN GENERATION APPARATUS AND FUEL CELL SYSTEM

(75) Inventors: Kunihiro Ukai, Nara (JP); Seiji Fujihara, Osaka (JP); Tomoya Takeuchi, Osaka (JP); Chie Harada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 120 days.

(21) Appl. No.: 13/817,395

(22) PCT Filed: Apr. 4, 2012

(86) PCT No.: PCT/JP2012/002366
§ 371 (c)(1),
(2), (4) Date: Feb. 15, 2013

(87) PCT Pub. No.: WO2012/147283
PCT Pub. Date: Nov. 1, 2012

(65) Prior Publication Data
US 2013/0143136 A1 Jun. 6, 2013

(30) Foreign Application Priority Data
Apr. 26, 2011 (JP) ................................ 2011-097853

(51) Int. Cl.
*C01B 3/38* (2006.01)
*H01M 8/04* (2006.01)
*H01M 8/06* (2006.01)

(52) U.S. Cl.
CPC . *C01B 3/382* (2013.01); *C01B 3/38* (2013.01); *H01M 8/0438* (2013.01);
(Continued)

(58) Field of Classification Search
CPC ............ H01M 8/0675; H01M 8/0618; H01M 8/04089; C01B 2203/1258; C01B 2203/1264; C01B 2203/127
USPC .................. 429/408, 416, 423, 443, 433, 410
See application file for complete search history.

(56) References Cited

U.S. PATENT DOCUMENTS 7,131,264 B2 * 11/2006 Weissman et al. ............... 60/286
2011/0195322 A1 8/2011 Ukai et al.

FOREIGN PATENT DOCUMENTS

| CA | 2316043 A1 | 2/2001 |
| JP | 01-275697 A | 11/1989 |

(Continued)

OTHER PUBLICATIONS
International Search Report mailed Jul. 3, 2012 issued in corresponding International Application No. PCT/JP2012/002366.
(Continued)

*Primary Examiner* — Ula C Ruddock
*Assistant Examiner* — Thomas Parsons
(74) *Attorney, Agent, or Firm* — McDermott Will & Emery LLP (57) ABSTRACT

A hydrogen generation apparatus and a fuel cell system including: a reformer (1) configured to generate a hydrogen-containing gas by causing a reforming reaction of a raw material; a hydrodesulfurizer (4) configured to remove a sulfur compound from the raw material; an adsorption desulfurizer (3) configured to remove a sulfur compound from the raw material; a first raw material passage (15) through which the raw material that is supplied to the reformer not through the adsorption desulfurizer but through the hydrodesulfurizer flows; a second raw material passage (16) through which the raw material that is supplied to the reformer through the adsorption desulfurizer; a switch (17, 18) configured to switch, between the first raw material passage and the second raw material passage, a raw material flowing passage through which the raw material flows; and a controller (12) configured such that when the reformer is generating the hydrogen-containing gas, the controller sets the raw material flowing passage to the first raw material passage by means of the switch if an oxygen concentration in the raw material is in a first state where the oxygen concentration is relatively low, and the controller sets the raw material flowing passage to the second raw material passage by means of the switch if the oxygen concentration in the raw material is in a second state where the oxygen concentration is relatively high.

18 Claims, 8 Drawing Sheets

(52) U.S. Cl.
CPC ......... *H01M 8/0612* (2013.01); *H01M 8/0675* (2013.01); *C01B 2203/0233* (2013.01); *C01B 2203/1064* (2013.01); *C01B 2203/127* (2013.01); *C01B 2203/1258* (2013.01); *Y02E 60/50* (2013.01)

(56) References Cited

FOREIGN PATENT DOCUMENTS

| JP | 05-114414 A | 5/1993 |
|----|----|----|
| JP | 07-057756 A | 3/1995 |
| JP | 10-214632 A | 8/1998 |
| JP | 2002373695 | * 12/2002 |
| JP | 2003-272691 A | 9/2003 |
| JP | 2007-131462 A | 5/2007 |
| JP | 2008-138153 A | 6/2008 |
| JP | 2009-249203 A | 10/2009 |
| JP | 2010-044885 A | 2/2010 |

OTHER PUBLICATIONS

Extended European Search Report issued in European Application No. 12775919.9 dated Jan. 20, 2014, 7 pgs.

* cited by examiner

HYDROGEN GENERATION APPARATUS AND FUEL CELL SYSTEM

RELATED APPLICATIONS

This application is the U.S. National Phase under 35 U.S.C. §371 of International Application No. PCT/JP2012/002366, filed on Apr. 4, 2012, which in turn claims the benefit of Japanese Application No. 2011-097853, filed on Apr. 26, 2011, the disclosures of which Applications are incorporated by reference herein.

TECHNICAL FIELD

The present invention relates to a hydrogen generation apparatus and a fuel cell system, and particularly to a hydrogen generation apparatus including a desulfurizer and a fuel cell system including a desulfurizer.

BACKGROUND ART

Fuel cell systems are configured to: supply a hydrogen-containing gas and an oxygen-containing gas to a fuel cell stack (hereinafter, simply referred to as a "fuel cell") which is the main body of the system's power generating part; cause an electrochemical reaction between hydrogen and oxygen to progress; and extract chemical energy generated by the electrochemical reaction as electrical energy to generate electric power. Fuel cell systems are capable of generating electric power with high efficiency, and readily utilizing thermal energy that is generated during the power generation operation. Therefore, fuel cell systems are being developed as distributed power generation systems that make it possible to realize highly efficient energy utilization.

Generally speaking, it is often the case that an infrastructure for supplying the hydrogen-containing gas is not developed. Therefore, in many cases, conventional fuel cell systems are provided with a hydrogen generation apparatus. Such a hydrogen generation apparatus includes a reformer. The reformer causes a reforming reaction between a raw material and steam by using a Ru catalyst or Ni catalyst at temperatures of 600 to 700° C. The raw material is, for example, city gas (fuel gas) containing natural gas as a main component, or LPG, which is supplied from an existing infrastructure.

Generally speaking, a sulfur-containing odorant such as DMS, TBM, or THT is added to the raw material such as city gas or LPG supplied from an infrastructure for the purpose of facilitating the detection of leakage of the raw material. The raw material originally contains sulfur compounds. Such a sulfur-containing odorant and sulfur compounds (these are hereinafter collectively referred to as sulfur compounds) cause poisoning of a catalyst used in the reformer or the like, such as a Ru catalyst or Ni catalyst. As a result, the reforming reaction is hindered.

In order to prevent the poisoning caused by the sulfur compounds, the hydrogen generation apparatus usually includes a desulfurizer configured to remove the sulfur compounds from the raw material before the raw material is introduced into the reformer. One of such desulfurizers is a hydrodesulfurizer configured to add hydrogen to sulfur compounds at a high temperature by means of a catalyst for hydrogenation (hereinafter, referred to as a hydrogenation catalyst), thereby converting the sulfur compounds into hydrogen sulfide, and to remove the hydrogen sulfide through chemisorption (see Patent Literature 1, for example). Since the hydrodesulfurizer removes sulfur compounds by converting the sulfur compounds into hydrogen sulfide, the desulfurizing capacity of the hydrodesulfurizer is great and the desulfurizer can be made compact.

There are cases where oxygen is temporarily mixed into the raw material due to reasons of the infrastructure's side. In this respect, there is proposed a method of pre-reforming an oxygen-containing process gas, such as natural gas, peak shaving gas, LPG, etc. (see Patent Literature 2, for example).

CITATION LIST

Patent Literature

PTL 1: Japanese Laid-Open Patent Application Publication No. 7-57756

PTL 2: Japanese Laid-Open Patent Application Publication No. 2001-80907

SUMMARY OF INVENTION

Technical Problem

In a hydrogen generation apparatus disclosed in Patent Literature 1, if an oxygen concentration increases in the raw material as described in Patent Literature 2, then there is a possibility that the reactivity of a reaction of hydrogenation (hereinafter, hydrogenation reaction) in the hydrodesulfurizer decreases, which causes an increase in the concentration of sulfur compounds to be supplied to the reformer.

The present invention has been made to solve the above problems. An object of the present invention is to provide a hydrogen generation apparatus and a fuel cell system, in which a possibility that a sulfur compound concentration increases in the raw material to be supplied to the reformer is reduced compared to a case where a hydrodesulfurizer is used to perform desulfurization when an oxygen concentration is high in the raw material.

Solution to Problem

The inventors of the present invention conducted diligent studies regarding the cause of decrease in the reactivity of the hydrogenation reaction in the hydrodesulfurizer, which decrease occurs when an oxygen concentration is high in the raw material. As a result, the inventors of the present invention obtained findings as described below.

Specifically, under a high-temperature condition, hydrogen and oxygen react with each other on a hydrogenation catalyst which adds hydrogen to sulfur compounds, and thereby hydrogen necessary for the hydrogenation reaction is consumed, which may cause a decrease in the reactivity of the hydrogenation reaction. In addition, there is a case where the reaction heat of the reaction between hydrogen and oxygen causes the temperature of the catalyst used for the hydrogenation reaction to deviate from a suitable temperature range. This may also cause a decrease in the reactivity of the hydrogenation reaction. In order to solve these problems, it is effective to use not a hydrodesulfurizer but an adsorption desulfurizer to desulfurize the raw material when the oxygen concentration in the raw material is high.

In order to solve the above conventional problems, a hydrogen generation apparatus according to the present invention includes: a reformer configured to generate a hydrogen-containing gas by causing a reforming reaction of a raw material; a hydrodesulfurizer configured to remove a sulfur compound from the raw material; an adsorption desulfurizer configured to remove a sulfur compound from the raw material; a first raw material passage through which the raw material that is supplied to the reformer not through the adsorption desulfurizer but through the hydrodesulfurizer flows; a second raw material passage through which the raw material that is supplied to the reformer through the adsorption desulfurizer flows; a switch configured to switch, between the first raw material passage and the second raw material passage, a raw material flowing passage through which the raw material flows; and a controller configured such that when the reformer is generating the hydrogen-containing gas, the controller sets the raw material flowing passage to the first raw material passage by means of the switch if an oxygen concentration in the raw material is in a first state where the oxygen concentration is relatively low, and the controller sets the raw material flowing passage to the second raw material passage by means of the switch if the oxygen concentration in the raw material is in a second state where the oxygen concentration is relatively high.

A fuel cell system according to the present invention includes: the above hydrogen generation apparatus; and a fuel cell configured to generate electric power by using the hydrogen-containing gas that is supplied from the hydrogen generation apparatus.

Advantageous Effects of Invention

According to the hydrogen generation apparatus and the fuel cell system of the present invention, a possibility that a sulfur compound concentration increases in the raw material to be supplied to the reformer is reduced compared to a case where a hydrodesulfurizer is used to perform desulfurization when an oxygen concentration is high in the raw material.

DESCRIPTION OF EMBODIMENTS

Embodiment 1

A hydrogen generation apparatus according to Embodiment 1 includes: a reformer configured to generate a hydrogen-containing gas by causing a reforming reaction of a raw material; a hydrodesulfurizer configured to remove a sulfur compound from the raw material; an adsorption desulfurizer configured to remove a sulfur compound from the raw material; a first raw material passage through which the raw material that is supplied to the reformer not through the adsorption desulfurizer but through the hydrodesulfurizer flows; a second raw material passage through which the raw material that is supplied to the reformer through the adsorption desulfurizer flows; a switch configured to switch, between the first raw material passage and the second raw material passage, a raw material flowing passage through which the raw material flows; and a controller configured such that when the reformer is generating the hydrogen-containing gas, the controller sets the raw material flowing passage to the first raw material passage by means of the switch if an oxygen concentration in the raw material is in a first state where the oxygen concentration is relatively low, and the controller sets the raw material flowing passage to the second raw material passage by means of the switch if the oxygen concentration in the raw material is in a second state where the oxygen concentration is relatively high.

According to the above configuration, a possibility that a sulfur compound concentration increases in the raw material to be supplied to the reformer is reduced compared to a case where a hydrodesulfurizer is used to perform desulfurization when an oxygen concentration is high in the raw material.

The first raw material passage and the second raw material passage may be completely separated individual passages, or part of these passages may be formed as a shared passage.

The switch may be configured in any form, so long as the switch is configured to switch the raw material flowing passage between the first raw material passage and the second raw material passage. For example, an on-off valve provided on the first raw material passage and an on-off valve provided on the second raw material passage may form the switch. Alternatively, an on-off valve provided on one of the first raw material passage and the second raw material passage, and a fixed orifice provided on the other one of the first raw material passage and the second raw material passage, may form the switch.

The hydrogen generation apparatus according to the present embodiment may include a first detector configured to detect a temperature of the hydrodesulfurizer. The controller may be configured such that the controller: sets the raw material flowing passage to the first raw material passage by means of the switch if a detection value of the first detector is less than a first threshold; and sets the raw material flowing passage to the second raw material passage by means of the switch if the detection value of the first detector is greater than or equal to a second threshold which is a value greater than or equal to the first threshold.

According to the above configuration, the state of the oxygen concentration in the raw material can be indirectly obtained based on the temperature of the hydrodesulfurizer. The reason for this is that when the oxygen concentration in the raw material increases, oxygen and hydrogen react with each other on a hydrogenation catalyst, which causes temperature increase.

In the hydrogen generation apparatus according to the present embodiment, the second raw material passage may be connected to the hydrodesulfurizer.

In the hydrogen generation apparatus according to the present embodiment, the reformer may include a reforming catalyst containing at least one of Pt and Rh as a constituent element.

According to the above configuration, even if oxygen that has passed through the desulfurizer is supplied to the reformer, reforming catalyst degradation is suppressed compared to other reforming catalysts that contain, for example, Ru or Ni as a constituent element.

Figure 1:
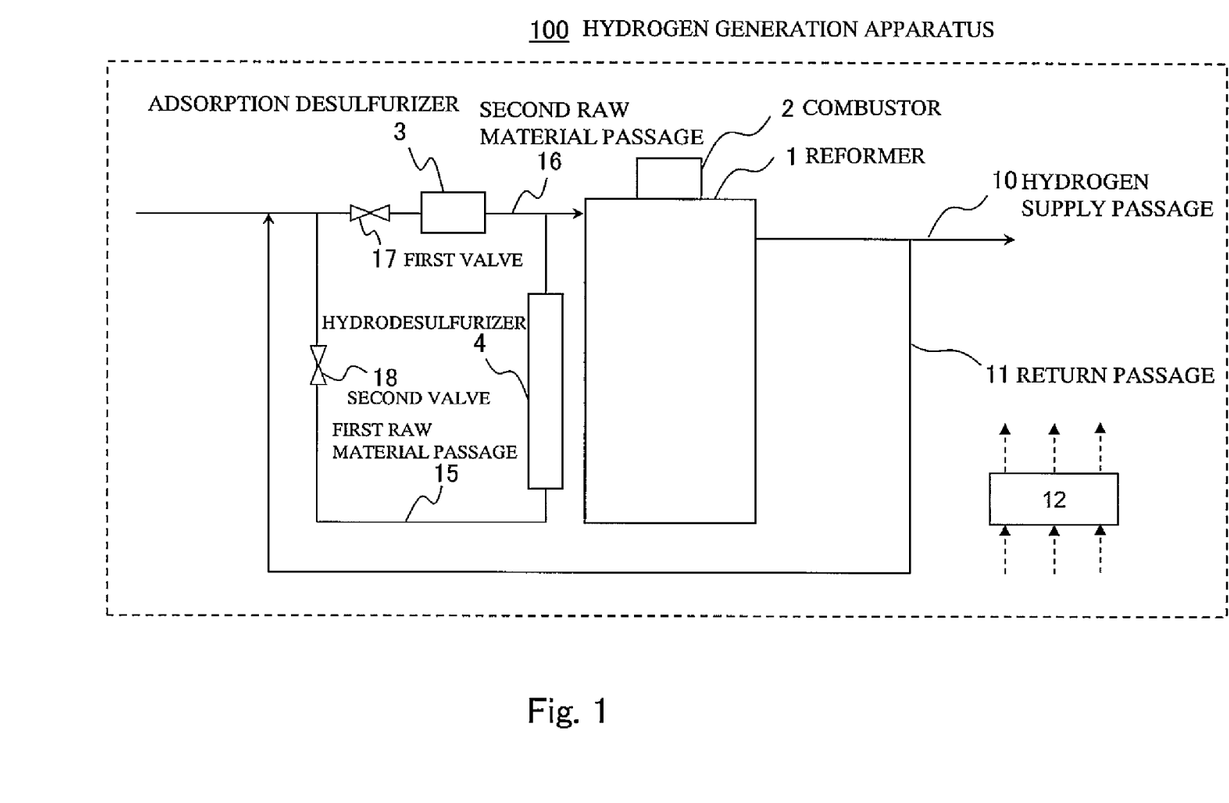
FIG. 1 is a conceptual diagram showing an example of a schematic configuration of a hydrogen generation apparatus according to Embodiment 1.

FIG. 1 is a conceptual diagram showing an example of a schematic configuration of the hydrogen generation apparatus according to Embodiment 1. As shown in FIG. 1, a hydrogen generation apparatus 100 according to the present embodiment includes: a reformer 1; an adsorption desulfurizer 3; a hydrodesulfurizer 4; a first raw material passage 15; a second raw material passage 16; a first valve 17; a second valve 18; and a controller 12.

The reformer 1 generates a hydrogen-containing gas by causing a reforming reaction of a raw material. The raw material contains an organic compound whose constituent elements are at least carbon and hydrogen. Specific examples of the raw material include hydrocarbons such as natural gas, LPG, and LNG, and alcohols such as methanol and ethanol. The reforming reaction may be any type of reforming reaction. Specific examples of the reforming reaction include steam reforming reaction, autothermal reaction, and partial oxidation reaction.

The adsorption desulfurizer 3 removes sulfur compounds from the raw material by physical adsorption. A normal-temperature adsorption desulfurizer configured to remove sulfur compounds by adsorption at a normal temperature is suitably used as the adsorption desulfurizer 3.

The hydrodesulfurizer 4 converts sulfur compounds in the raw material into hydrogen sulfide through a hydrogenation reaction, and chemisorbs the hydrogen sulfide. The hydrodesulfurizer 4 is disposed on the first raw material passage 15, and removes sulfur compounds from the raw material that flows within the first raw material passage 15.

The first raw material passage 15 branches off from the second raw material passage 16 at a position upstream from the adsorption desulfurizer 3, and extends through the hydrodesulfurizer 4 to merge with the second raw material passage 16 at a position downstream from the adsorption desulfurizer 3.

The first valve 17 is configured to open and close the second raw material passage 16. The first valve 17 is provided on the second raw material passage 16 at a position between the point where the second raw material passage 16 branches off from the first raw material passage 15 and the point where the second raw material passage 16 merges with the first raw material passage 15. In the example of FIG. 1, the first valve 17 is provided upstream from the adsorption desulfurizer 3. However, the first valve 17 may be provided at any position on the second raw material passage 16, so long as the position is located between the point where the second raw material passage 16 branches off from the first raw material passage 15 and the point where the second raw material passage 16 merges with the first raw material passage 15. For example, the first valve 17 may be provided downstream from the adsorption desulfurizer 3.

The second valve 18 is configured to open and close the first raw material passage 15. The second valve 18 is provided on the first raw material passage 15 at a position between the point where the first raw material passage 15 branches off from the second raw material passage 16 and the point where the first raw material passage 15 merges with the second raw material passage 16. In the example of FIG. 1, the second valve 18 is provided upstream from the hydrodesulfurizer 4. However, the second valve 18 may be provided at any position on the first raw material passage 15, so long as the position is located between the point where the first raw material passage 15 branches off from the second raw material passage 16 and the point where the first raw material passage 15 merges with the second raw material passage 16. For example, the second valve 18 may be provided downstream from the hydrodesulfurizer 4.

For example, a solenoid valve or the like can be used as the first valve 17 and the second valve 18. The first valve 17 and the second valve 18 form the switch in the example shown in FIG. 1.

The hydrogen-containing gas that is discharged from the reformer 1 is supplied to hydrogen utilizing equipment (not shown) through a hydrogen supply passage 10. A return passage 11 branches off from the hydrogen supply passage 10. The return passage 11 is connected to the first raw material passage 15 at a position upstream from the hydrodesulfurizer 4. The return passage 11 allows the hydrogen-containing gas generated by the reformer 1 to be supplied to the first raw material passage 15 at a position upstream from the hydrodesulfurizer 4. The hydrogen-containing gas is mixed with the raw material before the raw material flows into the hydrodesulfurizer 4, and is then supplied to the hydrodesulfurizer 4 to be utilized in the hydrogenation reaction. It should be noted that, in FIG. 1, the return passage 11 is configured to be connected to the first raw material passage 15 at a position upstream from the point where the first raw material passage 15 branches off from the second raw material passage 16. However, as an alternative, the return passage 11 may be connected to the first raw material passage 15 at a position downstream from the point where the first raw material passage 15 branches off from the second raw material passage 16 and upstream from the hydrodesulfurizer 4.

The reformer 1 may include a reforming catalyst containing at least one of Pt and Rh as a constituent element.

The controller 12 may be any device, so long as the controller 12 has a control function. The controller 12 includes an arithmetic processing unit (not shown) and a storage unit (not shown) storing control programs. Examples of the arithmetic processing unit include an MPU and CPU. The storage unit is a memory, for example. The controller may be configured as a single controller performing centralized control, or may be configured as a group of multiple controllers performing distributed control in cooperation with each other (the same is true for the controllers in the other embodiments and their variations). The controller 12 is communicably connected to a combustor 2, the first valve 17, and the second valve 18.

The hydrogen generation apparatus 100 further includes a raw material supply device which is not shown. The raw material supply device is provided on the first raw material passage 15 at a position that is downstream from the point where the return passage 11 is connected to the first raw material passage 15 and upstream from the hydrodesulfurizer 4. For example, the raw material supply device includes at least one of a booster and a flow rate adjusting valve. It should be noted that, in order for the raw material supply device to serve as a shared raw material supply device that supplies the raw material also to the adsorption desulfurizer, the raw material supply device (not shown) may be provided in FIG. 1 on the first raw material passage 15 at a position that is downstream from the point where the first raw material passage 15 is connected to the return passage 11 and upstream from the point where the first raw material passage 15 branches off from the second raw material passage 16.

The hydrogen generation apparatus 100 further includes an oxygen concentration state detector which is not shown. The oxygen concentration state detector detects the state of the oxygen concentration in the raw material. The oxygen concentration state detector may be any detector, so long as the detector is configured to detect the state of the oxygen concentration in the raw material. The state of the oxygen concentration herein is defined to mean at least one of an oxygen concentration value in the raw material and a relative oxygen concentration level in the raw material.

Specifically, at least one of a detector configured to directly detect the state of the oxygen concentration in the raw material and a detector configured to indirectly detect the state of the oxygen concentration in the raw material is used as the oxygen concentration state detector. Examples of the detector configured to directly detect the state of the oxygen concentration in the raw material include an oxygen concentration detector provided on a raw material passage and an information acquisition device configured to acquire oxygen concentration information from an external information holder holding the oxygen concentration information. Examples of the information holder include a server holding oxygen concentration information and a distributor holding oxygen concentration information.

The detector configured to indirectly detect the state of the oxygen concentration in the raw material is a detector detecting a physical quantity correlated with the state of the oxygen concentration in the raw material. Examples of the detector configured to indirectly detect the state of the oxygen concentration in the raw material include a first detector configured to detect the temperature of the hydrodesulfurizer, a second detector configured to detect the temperature of the reformer, a pressure detector configured to detect the supply pressure of the raw material, an ammonia concentration detector provided on the hydrogen supply passage 10, a temperature detector configured to detect an outdoor temperature, and an information acquisition device configured to acquire raw material composition information correlated with the state of the oxygen concentration. The raw material composition information correlated with the state of the oxygen concentration is, for example, information indicating that peak shaving is being performed.

The oxygen concentration state detector is communicably connected to the controller 12, and transmits to the controller 12 information related to the state of the oxygen concentration (e.g., the temperature of the hydrodesulfurizer, the temperature of the reformer, or the oxygen concentration).

The first detector detects, as the temperature of the hydrodesulfurizer, the intensity of heat that is generated when an oxidation reaction occurs between oxygen in the raw material and hydrogen in the hydrogen-containing gas supplied to the hydrodesulfurizer. Then, the controller 12 can determine a relative oxygen concentration level based on a value obtained from the first detector.

The first detector may be any detector, so long as the first detector is configured to detect the temperature of the hydrodesulfurizer. Specifically, at least one of a detector configured to directly detect the temperature of the hydrodesulfurizer and a detector configured to indirectly detect the temperature of the hydrodesulfurizer is used as the first detector.

The detector configured to directly detect the temperature of the hydrodesulfurizer may be provided at any position, so long as the position allows the detector to detect the temperature of the hydrodesulfurizer. Specific examples of the detector configured to directly detect the temperature of the hydrodesulfurizer include a detector detecting the temperature of the outer casing of the hydrodesulfurizer, a detector detecting the temperature of gas in the hydrodesulfurizer, a detector detecting the temperature of gas that has passed through the hydrodesulfurizer, and a detector detecting the temperature of a catalyst in the hydrodesulfurizer.

The detector configured to indirectly detect the temperature of the hydrodesulfurizer is a detector detecting a physical quantity correlated with the temperature of the hydrodesulfurizer. Examples of the detector configured to indirectly detect the temperature of the hydrodesulfurizer include a detector detecting the sulfur compound concentration in the raw material that has passed through the hydrodesulfurizer, a detector detecting the carbon monoxide concentration in the raw material that has passed through the hydrodesulfurizer, and a detector detecting an indirect temperature correlated with the temperature of the hydrodesulfurizer, such as an ambient temperature of the hydrodesulfurizer.

If the temperature of the hydrodesulfurizer increases, then a carbon monoxide methanation reaction progresses depending on the type of the hydrodesulfurization catalyst (e.g., CoMo-based hydrodesulfurization catalyst), and hydrogen is consumed by the methanation reaction. As a result, the amount of hydrogenation reaction of sulfur compounds decreases, and the sulfur compound concentration in the raw material that passes through the hydrodesulfurizer increases. Therefore, an increase in the temperature of the hydrodesulfurizer can be detected indirectly, by detecting an increase in the sulfur compound concentration in the raw material by the detector detecting the sulfur compound concentration in the raw material that has passed through the hydrodesulfurizer.

Similarly, if the temperature of the hydrodesulfurizer increases, then an inverse shift reaction progresses depending on the type of the hydrodesulfurization catalyst (e.g., CuZn-based hydrodesulfurization catalyst), causing an increase in carbon monoxide concentration. Therefore, an increase in the temperature of the hydrodesulfurizer can be detected indirectly, by detecting an increase in the carbon monoxide concentration by the detector detecting the carbon monoxide concentration in the raw material that has passed through the hydrodesulfurizer.

The second detector detects, as the temperature of the reformer, the intensity of heat that is generated when an oxidation reaction occurs between oxygen in the raw material supplied to the reformer and hydrogen generated by the reformer. Then, the controller 12 can determine a relative oxygen concentration level based on a temperature obtained from the second detector.

The second detector may be any detector, so long as the detector is configured to detect the temperature of the reformer. Specifically, at least one of a detector configured to directly detect the temperature of the reformer and a detector configured to indirectly detect the temperature of the reformer is used as the second detector.

The detector configured to directly detect the temperature of the reformer may be provided at any position, so long as the position allows the detector to detect the temperature of the reformer. Specific examples of the detector configured to directly detect the temperature of the reformer include a detector detecting the temperature of the outer casing of the reformer, a detector detecting the temperature of the reforming catalyst, a detector detecting the temperature of gas in the reformer, and a detector detecting the temperature of gas that has passed through the reformer.

The detector configured to indirectly detect the temperature of the reformer is a detector detecting a physical quantity correlated with the temperature of the reformer. Examples of the detector configured to indirectly detect the temperature of the reformer include a hydrogen concentration detector detecting the hydrogen concentration in the hydrogen-containing gas that has passed through the reformer, a temperature detector detecting the temperature of a device (e.g., the hydrodesulfurizer) that receives heat transmitted from the reformer, a temperature detector detecting the temperature of a device (e.g., a shift converter) through which the hydrogen-containing gas that has passed through the reformer flows, and a temperature detector detecting an indirect temperature correlated with the temperature of the reformer, such as an ambient temperature of the reformer.

Usually, the supply pressure of the raw material is in a reduced state before peak shaving is performed, and after the peak shaving is performed, the reduced raw material supply pressure returns to the previous level. Based on such pressure changes detected by the pressure detector, the controller 12 can determine that the oxygen concentration in the raw material is high due to peak shaving.

Moreover, when the outdoor temperature is low and thermal demand is high, peak shaving occurs in order to compensate for a shortfall of the raw material. Accordingly, if a detection value of the temperature detector configured to detect the outdoor temperature is less than or equal to a value (e.g., $-5°$ C.) at which peak shaving is estimated to occur, then it can be determined that the oxygen concentration in the raw material is high due to the peak shaving.

The oxygen concentration detector can directly detect an oxygen concentration value.

The ammonia concentration detector detects an ammonia concentration in the hydrogen-containing gas. In a case where oxygen is mixed into the raw material, air is usually mixed into the raw material. Accordingly, not only oxygen but also nitrogen is mixed into the raw material. Nitrogen mixed into the raw material reacts with hydrogen generated by the reformer 1, and as a result, ammonia is produced. Therefore, a relative oxygen concentration level can be determined based on a concentration obtained from the ammonia concentration detector.

Although not shown in FIG. 1, a carbon monoxide reducer configured to reduce the carbon monoxide concentration in the hydrogen-containing gas may be provided on a passage downstream from the reformer 1. For example, at least one of a shift converter and a carbon monoxide remover is used as the carbon monoxide reducer. The shift converter reduces carbon monoxide through a shift reaction. The carbon monoxide remover reduces carbon monoxide through at least one of an oxidation reaction and a methanation reaction.

Figure 2:
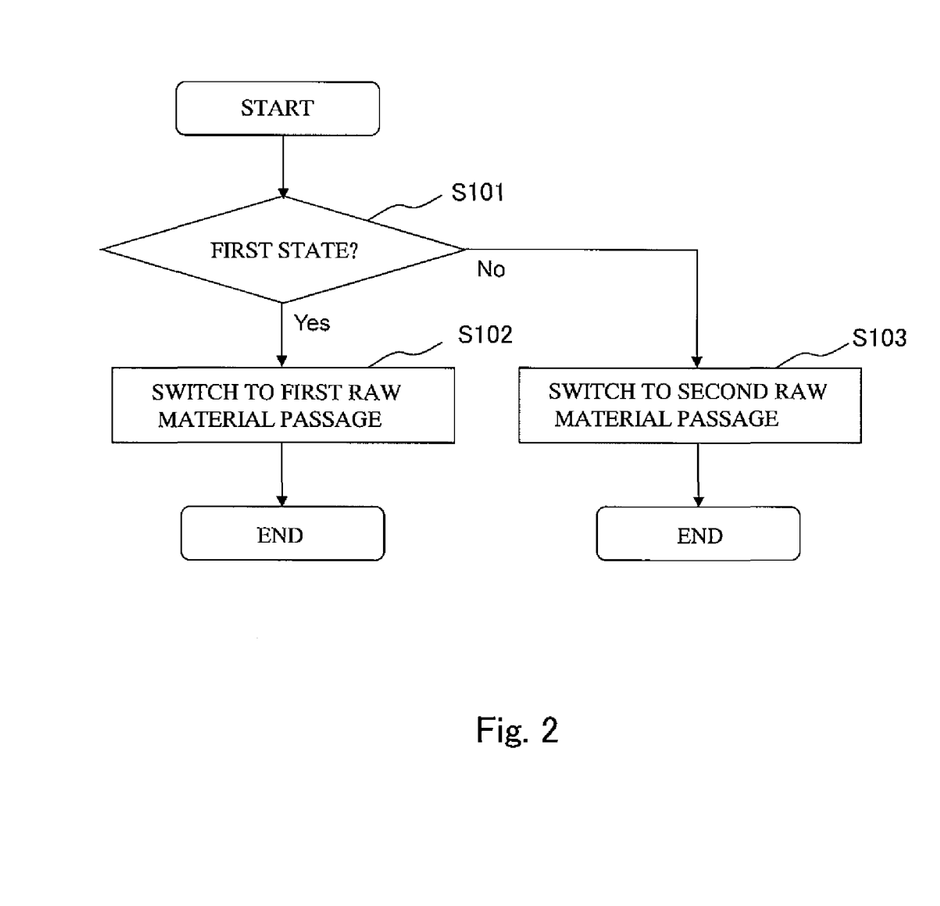
FIG. 2 is a flowchart showing an example of a method of operating the hydrogen generation apparatus according to Embodiment 1.

FIG. 2 is a flowchart showing an example of a method of operating the hydrogen generation apparatus according to Embodiment 1. Hereinafter, the method of operating the hydrogen generation apparatus 100 is described with reference to FIG. 2.

When the hydrogen generation apparatus 100 starts an oxygen concentration state determination operation (START), the controller 12 determines based on information received from the oxygen concentration state detector whether the state of the oxygen concentration is a first state (step S101). The first state herein refers to a state where the oxygen concentration in the raw material is relatively lower than the oxygen concentration in the raw material in a second state. The second state refers to a state where the oxygen concentration in the raw material is relatively higher than the oxygen concentration in the raw material in the first state.

If the state of the oxygen concentration in the raw material is the first state, the result of the determination in step S101 is Yes. Accordingly, the controller 12 closes the first valve 17 and opens the second valve 18 to switch the raw material flowing passage to the first raw material passage 15 (step S102), and ends the determination operation (END). As a result, the raw material is supplied to the reformer 1 through the first raw material passage 15 and the hydrodesulfurizer 4. At the time, in the configuration shown in FIG. 1, the raw material does not flow through the adsorption desulfurizer 3.

If the state of the oxygen concentration in the raw material is the second state, the result of the determination in step S102 is No. Accordingly, the controller 12 opens the first valve 17 and closes the second valve 18 to switch the raw material flowing passage to the second raw material passage 16 (step S103), and ends the determination operation (END). As a result, the raw material is supplied to the reformer 1 through the second raw material passage 16 and the adsorption desulfurizer 3. At the time, in the configuration shown in FIG. 1, the raw material does not flow through the hydrodesulfurizer 4.

EXAMPLE

A hydrogen generation apparatus according to an example of the present embodiment includes the first detector configured to detect the temperature of the hydrodesulfurizer as an oxygen concentration state detector. Other than this, the hydrogen generation apparatus according to the present example may be configured in the same manner as the hydrogen generation apparatus according to Embodiment 1.

Figure 3:
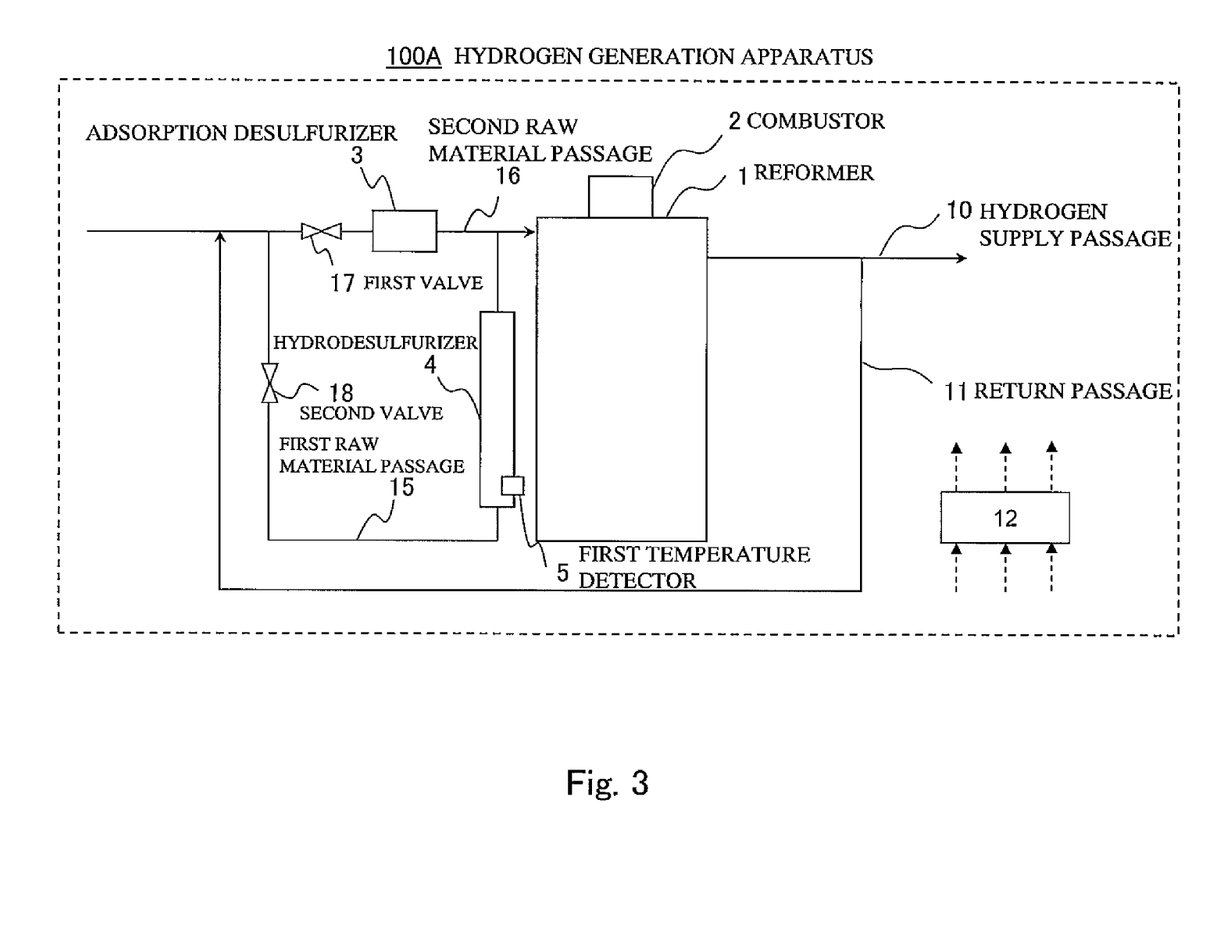
FIG. 3 is a conceptual diagram showing an example of a schematic configuration of a hydrogen generation apparatus according an example of Embodiment 1.

FIG. 3 is a conceptual diagram showing an example of a schematic configuration of the hydrogen generation apparatus according to the example of Embodiment 1. A hydrogen generation apparatus 100A according to the present example illustratively shown in FIG. 3 is configured such that the hydrogen generation apparatus according to Embodiment 1 illustratively shown in FIG. 1 further includes, as an oxygen concentration state detector, a first detector 5 configured to detect the temperature of the hydrodesulfurizer. The other components of the hydrogen generation apparatus 100A shown in FIG. 3 may be the same as those of the hydrogen generation apparatus 100 shown in FIG. 1. Therefore, the common components between FIG. 1 and FIG. 3 are denoted by the same reference signs and names, and a description of such components will be omitted.

For example, a temperature detector such as a thermocouple can be used as the first detector 5. The first detector 5 is disposed, for example, on the outer wall of or in the interior of the hydrodesulfurizer 4. The first detector 5 is communicably connected to the controller 12, and transmits the temperature of the hydrodesulfurizer 4 to the controller 12.

The method of operating the hydrogen generation apparatus according to the present example may be the same as the method shown in FIG. 2. That is, in step S101 of FIG. 2, the controller 12 according to the present example determines the state of the oxygen concentration in the raw material based on a detection value of the first detector 5. If the detection value of the first detector 5 is less than a first threshold, then it is determined that the oxygen concentration in the raw material is in the first state. If the detection value of the first detector 5 is greater than or equal to the first threshold, then it is determined that the oxygen concentration in the raw material is in the second state. Since the other operations are the same as those shown in FIG. 2, a description of the other operations is omitted.

It should be noted that, in the present example, once the raw material flowing passage is switched to the second raw material passage, then the raw material does not flow through the hydrodesulfurizer 4. In this case, the temperature of the hydrodesulfurizer 4 is not affected by the oxygen concentration in the raw material, and therefore, the state of the oxygen concentration cannot be detected by using the first detector 5. For this reason, the reformer 1 or the like may further include an oxygen concentration state detector different from the first detector 5 (e.g., the second detector), and the raw material flowing passage may be switched back to the first raw material passage when it is detected that the state of the oxygen concentration has become the first state. For example, the controller 12 may be configured to determine that the state of the oxygen concentration in the raw material is the first state when a detection value of the second detector is less than a second threshold, and to determine that the state of the oxygen concentration in the raw material is the second state when the detection value of the second detector is equal to or greater than the second threshold.

[Variation]

In a hydrogen generation apparatus according to a variation of the present embodiment, the second raw material passage is connected to the hydrodesulfurizer. Other than this, the hydrogen generation apparatus according to the present variation may be configured in the same manner as the hydrogen generation apparatus according to Embodiment 1.

Next, the hydrogen generation apparatus according to the present variation is described in detail.

Figure 4:
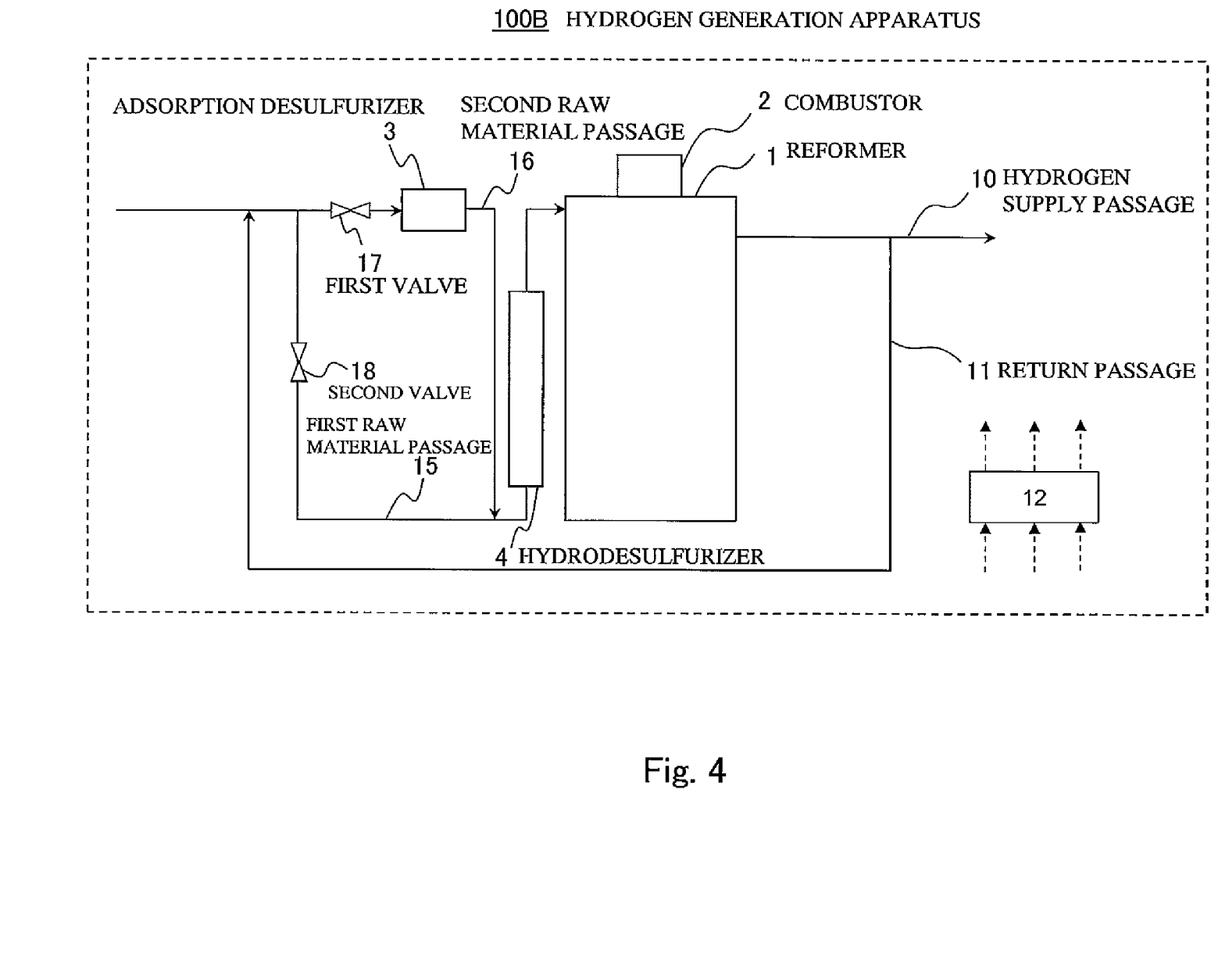
FIG. 4 is a conceptual diagram showing an example of a schematic configuration of a hydrogen generation apparatus according to a variation of Embodiment 1.

FIG. 4 is a conceptual diagram showing an example of a schematic configuration of the hydrogen generation apparatus according to the variation of Embodiment 1. A hydrogen generation apparatus 100B according to the present variation illustratively shown in FIG. 4 is configured such that, in the hydrogen generation apparatus according to Embodiment 1 illustratively shown in FIG. 1, the second raw material passage 16 branches off from the first raw material passage 15 at a position upstream from the hydrodesulfurizer 4 and merges with the first raw material passage 15 of the hydrodesulfurizer 4. Further, the first detector 5 configured to detect the temperature of the hydrodesulfurizer 4 is added to the hydrogen generation apparatus 100B. The other components of the hydrogen generation apparatus 100B shown in FIG. 4 may be the same as those of the hydrogen generation apparatus 100 shown in FIG. 1. Therefore, the common components between FIG. 1 and FIG. 4 are denoted by the same reference signs and names, and a description of such components will be omitted.

The method of operating the hydrogen generation apparatus according to the present variation may be the same as the method shown in FIG. 2. However, in the present variation, if it is determined that the oxygen concentration in the raw material is in the second state, the raw material flows through the hydrodesulfurizer 4 after flowing through the adsorption desulfurizer 3, and is then supplied to the reformer 1.

Embodiment 2

In a hydrogen generation apparatus according to Embodiment 2, the controller performs an operation of suppressing a temperature increase of the reformer after setting the raw material flowing passage to the second raw material passage by means of the switch.

According to the above configuration, overheating of the reformer due to an increase in the oxygen concentration in the raw material can be suppressed.

Other than the above configuration, the hydrogen generation apparatus according to the present embodiment may be configured in the same manner as at least one of the hydrogen generation apparatuses according to Embodiment 1, the example of Embodiment 1, and the variation of Embodiment 1.

Next, the hydrogen generation apparatus according to the present embodiment is described in detail.

Since the hardware configuration according to the present embodiment may be the same as the one shown in FIG. 1, a detailed description of the hardware configuration is omitted.

For example, the "operation of suppressing a temperature increase of the reformer" is at least one of the following controls: control of decreasing the amount of fuel supplied to the combustor 2; control of increasing an air ratio ($\lambda$) by increasing the amount of combustion air supplied to the combustor 2; and control of increasing S/C by increasing the amount of steam supplied to the reformer 1. The term air ratio herein refers to the ratio of an actual amount of air usage to the theoretical air requirement necessary for perfect combustion. The term S/C refers to the ratio of the number of moles of water molecules in the steam supplied to the reformer to the number of moles of carbon atoms in the raw material supplied to the reformer.

Figure 5:
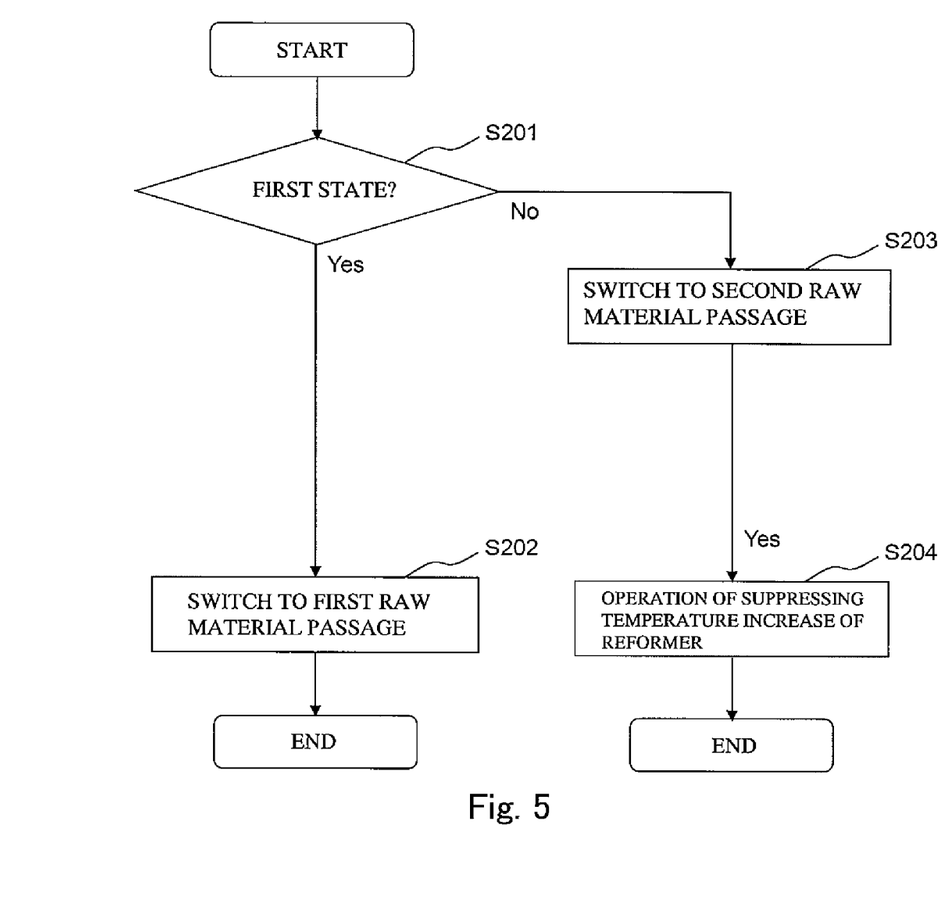
FIG. 5 is a flowchart showing an example of a method of operating a hydrogen generation apparatus according to Embodiment 2.

FIG. 5 is a flowchart showing an example of a method of operating the hydrogen generation apparatus according to Embodiment 2. Hereinafter, the method of operating the hydrogen generation apparatus according to Embodiment 2 is described with reference to FIG. 5.

When the hydrogen generation apparatus starts an oxygen concentration state determination operation (START), the controller 12 determines based on information received from the oxygen concentration state detector whether the state of the oxygen concentration is the first state (step S201).

If the state of the oxygen concentration in the raw material is the first state, the result of the determination in step S201 is Yes. Accordingly, the controller 12 closes the first valve 17 and opens the second valve 18 to switch the raw material flowing passage to the first raw material passage 15 (step S202), and ends the determination operation (END). As a result, the raw material is supplied to the reformer 1 through the first raw material passage 15 and the hydrodesulfurizer 4.

If the state of the oxygen concentration in the raw material is the second state, the result of the determination in step S202 is No. Accordingly, the controller 12 opens the first valve 17 and closes the second valve 18 to switch the raw material flowing passage to the second raw material passage 16 (step S203). Then, the controller 12 performs the operation of suppressing a temperature increase of the reformer (step S204), and ends the determination operation (END). As a result, the raw material is supplied to the reformer 1 through the second raw material passage 16 and the adsorption desulfurizer 3, and also, a temperature increase of the reformer is suppressed.

Embodiment 3

In a hydrogen generation apparatus according to Embodiment 3, when the raw material flowing passage is set to the second raw material passage by means of the switch, the controller controls a temperature of the reformer to be higher than the temperature of the reformer of when the raw material flowing passage is set to the first raw material passage.

According to the above configuration, even in a case where the temperature of the reformer increases when the oxygen concentration in the raw material is relatively high, a possibility that the reformer is determined to be in an abnormal high-temperature state is reduced since a control target temperature is increased.

Other than the above configuration, the hydrogen generation apparatus according to the present embodiment may be configured in the same manner as at least one of the hydrogen generation apparatuses according to Embodiment 1, Embodiment 2, examples of the embodiments, and variations of the embodiments.

Next, the hydrogen generation apparatus according to the present embodiment is described in detail.

Since the hardware configuration according to the present embodiment may be the same as the one shown in FIG. 1, a detailed description of the hardware configuration is omitted.

Specifically, the expression "controls a temperature of the reformer to be higher than the temperature of the reformer of when the raw material flowing passage is set to the first raw material passage" refers to, for example, setting a control target temperature of the reformer to be higher than the control target temperature of the reformer of when the oxygen concentration in the raw material is in the second state. One specific example of an operation of controlling the temperature of the reformer is to control the amount of heating by the combustor 2.

Figure 6:
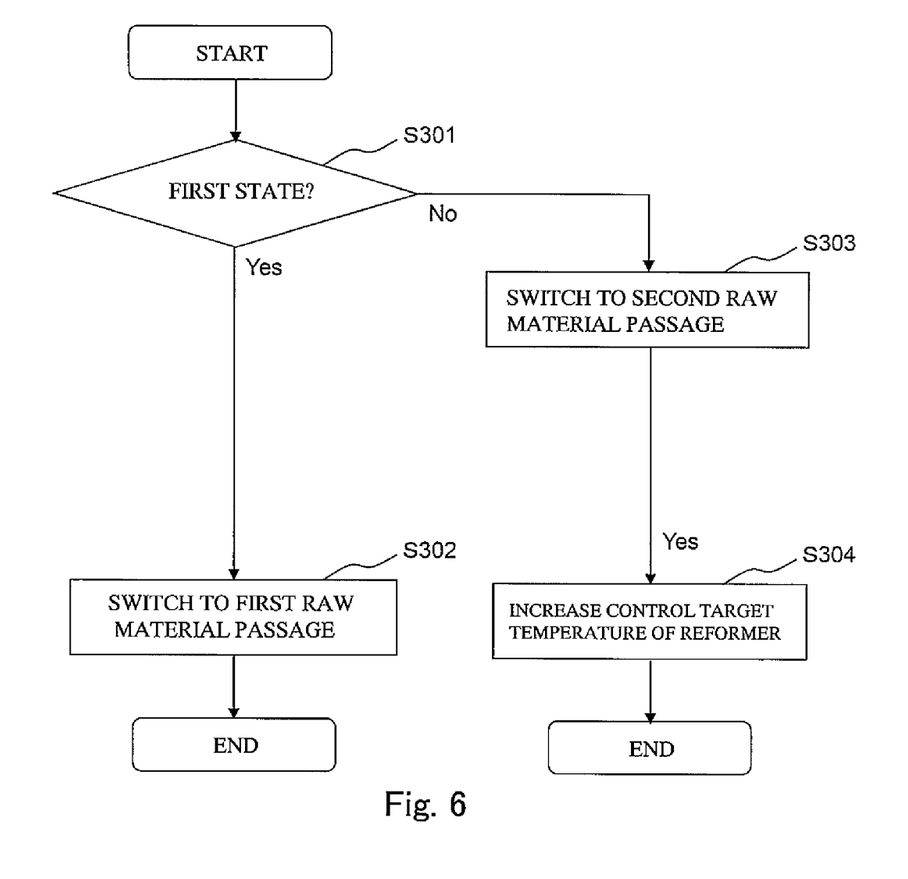
FIG. 6 is a flowchart showing an example of a method of operating a hydrogen generation apparatus according to Embodiment 3.

FIG. 6 is a flowchart showing an example of a method of operating the hydrogen generation apparatus according to Embodiment 3. Hereinafter, the method of operating the hydrogen generation apparatus according to Embodiment 3 is described with reference to FIG. 6.

When the hydrogen generation apparatus starts an oxygen concentration state determination operation (START), the controller 12 determines based on information received from the oxygen concentration state detector whether the state of the oxygen concentration is the first state (step S301).

If the state of the oxygen concentration in the raw material is the first state, the result of the determination in step S301 is Yes. Accordingly, the controller 12 closes the first valve 17 and opens the second valve 18 to switch the raw material flowing passage to the first raw material passage 15 (step S302), and ends the determination operation (END). As a result, the raw material is supplied to the reformer 1 through the first raw material passage 15 and the hydrodesulfurizer 4.

If the state of the oxygen concentration in the raw material is the first state, the result of the determination in step S302 is No. Accordingly, the controller 12 opens the first valve 17 and closes the second valve 18 to switch the raw material flowing passage to the second raw material passage 16 (step S303). Then, the controller 12 increases the control target temperature of the reformer (step S304), and ends the determination operation (END). As a result, the raw material is supplied to the reformer 1 through the second raw material passage 16 and the adsorption desulfurizer 3, and also, the control target temperature of the reformer is set to be higher than the control target temperature of the reformer of when the oxygen concentration in the raw material is in the first state. Consequently, the temperature of the reformer 1 is controlled to be higher than the temperature of the reformer 1 of when the raw material flowing passage is set to the first raw material passage 15.

Embodiment 4

A hydrogen generation apparatus according to Embodiment 4 includes a second detector configured to detect a temperature of the reformer. The controller is configured such that, after setting the raw material flowing passage to the second raw material passage by means of the switch, the controller stops an operation if a detection value of the second detector becomes greater than or equal to a third threshold.

According to the above configuration, spreading of damage to the reformer can be suppressed in a case where the oxygen concentration in the raw material has increased to such a level that excessive heat damage to the reformer is caused if the operation of the hydrogen generation apparatus is continued.

The third threshold herein may be defined as a value corresponding to a temperature that is higher than a controlled temperature of the reformer.

Other than the above configuration, the hydrogen generation apparatus according to the present embodiment may be configured in the same manner as at least one of the hydrogen generation apparatuses according to Embodiment 1, Embodiment 2, Embodiment 3, examples of the embodiments, and variations of the embodiments.

Next, the hydrogen generation apparatus according to the present embodiment is described in detail.

Since the hardware configuration according to the present embodiment may be the same as the one shown in FIG. 1, a detailed description of the hardware configuration is omitted. The second detector is not shown in the drawing.

For example, a temperature detector such as a thermocouple can be used as the second detector. The second detector is disposed, for example, on the outer wall of or in the interior of the reformer 1. The second detector is communicably connected to the controller 12, and transmits the temperature of the reformer 1 to the controller 12.

It should be noted that, in the hydrogen generation apparatus according to the present embodiment, the manner of controlling the temperature of the reformer 1 after the raw material flowing passage is switched to the second raw material passage 16 may be either changed or not changed from the manner of controlling the temperature of the reformer 1 of when the raw material flowing passage is set to the first raw material passage 15.

In a case where the manner of controlling the temperature of the reformer 1 is changed as mentioned above, the hydrogen generation apparatus may perform, for example, an operation of suppressing a temperature increase of the reformer similar to Embodiment 2, or alternatively, the hydrogen generation apparatus may control, for example, similar to Embodiment 3, the temperature of the reformer to be higher than the temperature of the reformer of when the raw material flowing passage is set to the first raw material passage.

Figure 7:
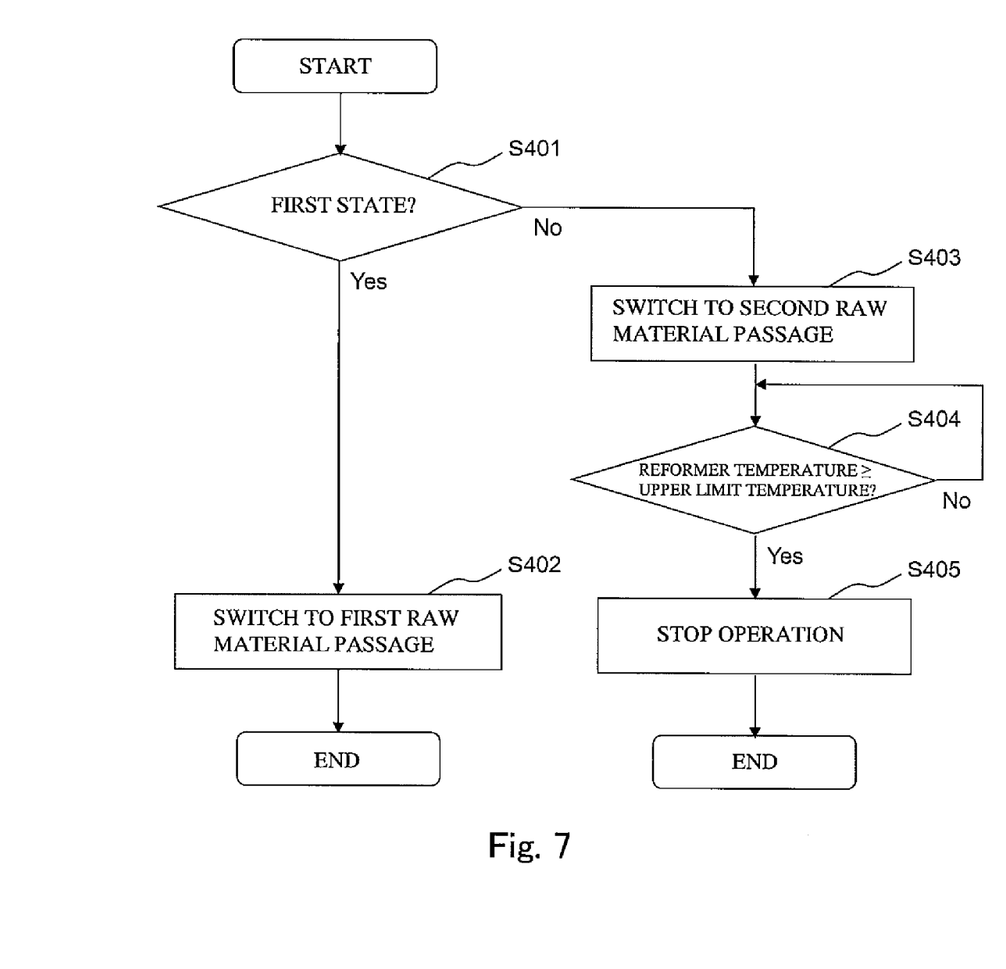
FIG. 7 is a flowchart showing an example of a method of operating a hydrogen generation apparatus according to Embodiment 4.

FIG. 7 is a flowchart showing an example of a method of operating the hydrogen generation apparatus according to Embodiment 4. Hereinafter, the method of operating the hydrogen generation apparatus according to Embodiment 4 is described with reference to FIG. 7.

When the hydrogen generation apparatus starts an oxygen concentration state determination operation (START), the controller 12 determines based on information received from the oxygen concentration state detector whether the state of the oxygen concentration is the first state (step S401).

If the state of the oxygen concentration in the raw material is the first state, the result of the determination in step S401 is Yes. Accordingly, the controller 12 closes the first valve 17 and opens the second valve 18 to switch the raw material flowing passage to the first raw material passage 15 (step S402), and ends the determination operation (END). As a result, the raw material is supplied to the reformer 1 through the first raw material passage 15 and the hydrodesulfurizer 4.

If the state of the oxygen concentration in the raw material is the first state, the result of the determination in step S402 is No. Accordingly, the controller 12 opens the first valve 17 and closes the second valve 18 to switch the raw material flowing passage to the second raw material passage 16 (step S403). As a result, the raw material is supplied to the reformer 1 through the second raw material passage 16 and the adsorption desulfurizer 3.

Thereafter, based on a result of the detection by the second detector, the controller 12 determines whether the temperature of the reformer 1 has become higher than or equal to an upper limit temperature (step S404). Specifically, for example, the controller 12 determines whether a detection value of the second detector is greater than or equal to the third threshold.

The third threshold herein is defined as a value corresponding to a temperature that is higher than a controlled temperature of the reformer of when the raw material flowing passage is set to the second raw material passage. If the second detector is configured to directly detect the temperature of the reformer 1, then the third threshold is defined as a temperature that is higher than the controlled temperature of the reformer of when the raw material flowing passage is set to the second raw material passage.

When the oxygen concentration in the raw material increases, hydrogen and oxygen in the reformer 1 react with each other, and the temperature of the reformer 1 increases, accordingly. On the other hand, when the oxygen concentration in the raw material decreases, the reaction between hydrogen and oxygen in the reformer 1 decreases, and the temperature of the reformer 1 decreases, accordingly. Therefore, the state of the oxygen concentration in the raw material can be indirectly detected by detecting the temperature of the reformer 1 with the second detector.

If the result of the determination in step S404 is No, the determination in step S404 is performed again.

If the result of the determination in step S404 is Yes, the controller 12 stops the operation of the hydrogen generation apparatus (step S405) and ends the determination operation (END).

Embodiment 5

A fuel cell system according to Embodiment 5 includes a hydrogen generation apparatus and a fuel cell configured to generate electric power by using a hydrogen-containing gas supplied from the hydrogen generation apparatus.

The hydrogen generation apparatus may be configured such that at least one of the following is applied thereto: Embodiment 1, the example and the variation of Embodiment 1, Embodiment 2, the variation of Embodiment 2, Embodiment 3, the variation of Embodiment 3, Embodiment 4, and the variation of Embodiment 4.

Next, the hydrogen generation apparatus according to the present embodiment is described in detail.

Figure 8:
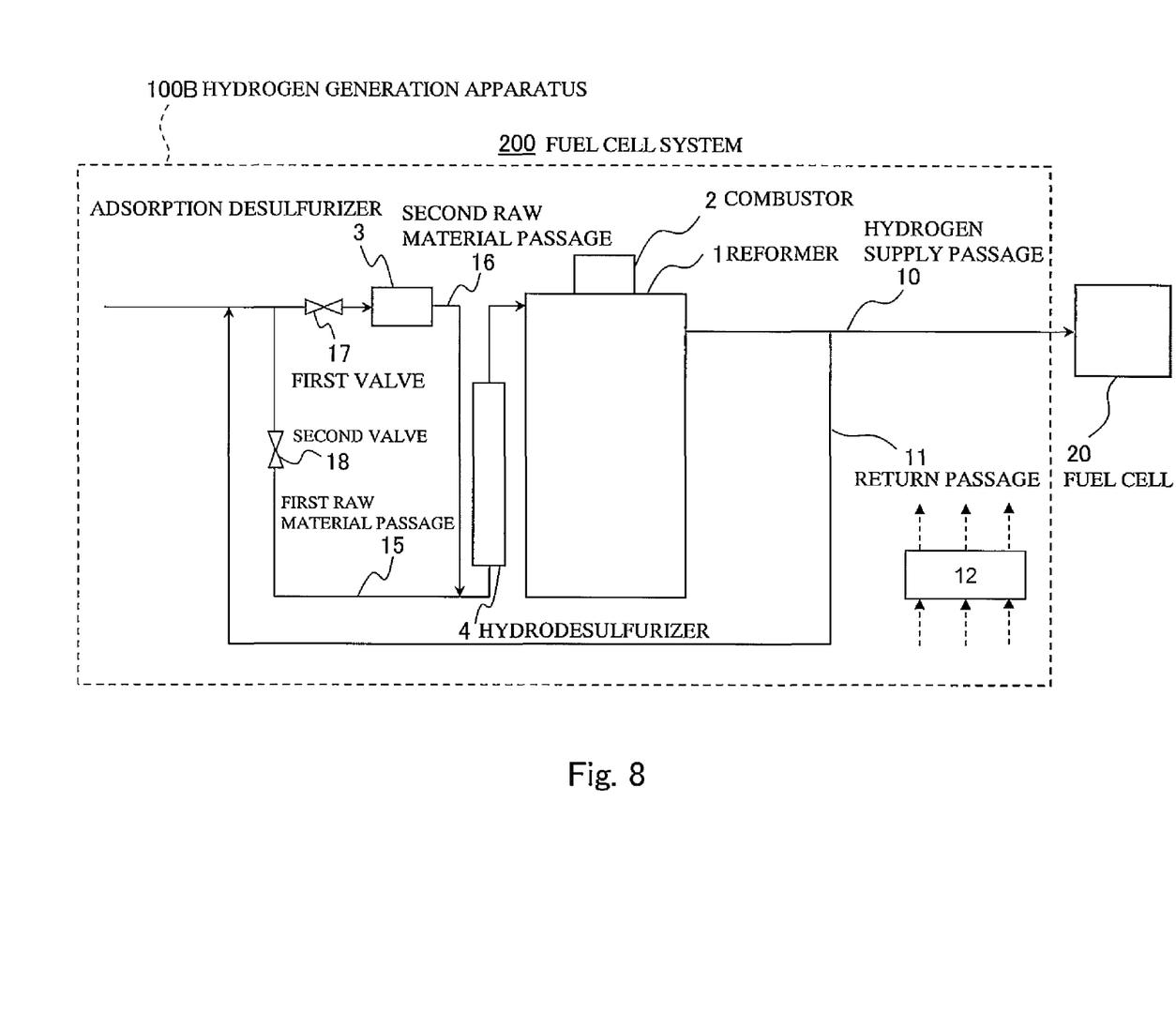
FIG. 8 is a conceptual diagram showing an example of a schematic configuration of a fuel cell system according to Embodiment 5.

FIG. 8 is a conceptual diagram showing an example of a schematic configuration of the fuel cell system according to Embodiment 5. A fuel cell system 200 according to the present embodiment illustratively shown in FIG. 8 includes a fuel cell 20 in addition to the hydrogen generation apparatus 100 according to Embodiment 1 illustratively shown in FIG. 1. The other components of the fuel cell system 200 shown in FIG. 8 may be the same as those of the hydrogen generation apparatus 100 shown in FIG. 1. Therefore, the common components between FIG. 1 and FIG. 8 are denoted by the same reference signs and names, and a description of such components will be omitted.

The fuel cell 20 is configured to generate electric power by using the hydrogen-containing gas that is supplied from the hydrogen generation apparatus 100. The fuel cell 20 may be, for example, a solid polymer fuel cell (PEFC) or a solid oxide fuel cell (SOFC).

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art.

INDUSTRIAL APPLICABILITY

The hydrogen generation apparatus and the fuel cell system according to the present invention are useful as a hydrogen generation apparatus and a fuel cell system capable of suppressing a decrease in the reactivity of a hydrogenation reaction in a desulfurizer when oxygen is mixed into a raw material.

REFERENCE SIGNS LIST 1 reformer
2 combustor
3 adsorption desulfurizer
4 hydrodesulfurizer
5 first detector
10 hydrogen supply passage
11 return passage
12 controller
15 first raw material passage
16 second raw material passage
17 first valve
18 second valve
20 fuel cell
100 hydrogen generation apparatus
100A hydrogen generation apparatus
100B hydrogen generation apparatus
200 fuel cell system

The invention claimed is:
1. A hydrogen generation apparatus comprising:
   a reformer that generates a hydrogen-containing gas by causing a reforming reaction of a raw material;
   a hydrodesulfurizer that removes a sulfur compound from the raw material;
   an adsorption desulfurizer that removes a sulfur compound from the raw material;
   a first raw material passage through which the raw material that is supplied to the reformer not through the adsorption desulfurizer but through the hydrodesulfurizer flows;
   a second raw material passage through which the raw material that is supplied to the reformer through the adsorption desulfurizer flows;
   a switch that switches, between the first raw material passage and the second raw material passage, a raw material flowing passage through which the raw material flows; and
   a controller including a processor and a memory storing a program,
   wherein the program, when executed by the processor, causes the controller to perform operations including:
   when the reformer is generating the hydrogen-containing gas,
   setting the raw material flowing passage to the first raw material passage by the switch when an oxygen concentration in the raw material is in a first state, and
   setting the raw material flowing passage to the second raw material passage by the switch when the oxygen concentration in the raw material is in a second state, the oxygen concentration in the second state being higher than the oxygen concentration in the first state.

2. The hydrogen generation apparatus according to claim 1, wherein
the program, when executed by the processor, further causes the controller to perform operations including:
setting the raw material flowing passage to the first raw material passage by the switch when a temperature of the hydrodesulfurizer is less than a first threshold; and
setting the raw material flowing passage to the second raw material passage by the switch when the temperature of the hydrodesulfurizer is greater than or equal to a second threshold which is greater than or equal to the first threshold.

3. The hydrogen generation apparatus according to claim 1, wherein
the program, when executed by the processor, further causes the controller to perform operations including:
performing an operation of suppressing a temperature increase of the reformer after setting the raw material flowing passage to the second raw material passage by the switch.

4. The hydrogen generation apparatus according to claim 1, wherein the program, when executed by the processor, further causes the controller to perform, when the raw material flowing passage is set to the second raw material passage by the switch, operations including: controlling a temperature of the reformer to be higher in a case when the raw material flowing passage is set to the second raw material passage by the switch than in a case when the raw material flowing passage is set to the first raw material passage.

5. The hydrogen generation apparatus according to claim 1, wherein
the program, when executed by the processor, further causes the controller to perform operations including:
after setting the raw material flowing passage to the second raw material passage by the switch, stopping an operation when a temperature of the reformer becomes greater than or equal to a third threshold.

6. The hydrogen generation apparatus according to claim 1, wherein the second raw material passage is connected to the hydrodesulfurizer.

7. The hydrogen generation apparatus according to claim 1, wherein the reformer includes a reforming catalyst containing at least one of Pt and Rh as a constituent element.

8. A fuel cell system comprising:
the hydrogen generation apparatus according to claim 1; and
a fuel cell that generates electric power by using the hydrogen-containing gas that is supplied from the hydrogen generation apparatus.

9. The hydrogen generation apparatus according to claim 1, further comprising an oxygen concentration detector that directly or indirectly detects the oxygen concentration in the raw material.

10. The hydrogen generation apparatus according to claim 1, wherein the program, when executed by the processor, causes the controller to perform, when the reformer is generating the hydrogen-containing gas, and when the raw material flowing passage is set to the first raw material passage by the switch, operations including:
setting the raw material flowing passage to the second raw material passage by the switch when the oxygen concentration in the raw material turns to the second state.

11. The hydrogen generation apparatus according to claim 1, wherein the program, when executed by the processor, further causes the controller to perform, when the reformer is generating the hydrogen-containing gas, operations including:
setting the raw material flowing passage to the first raw material passage by the switch when peak shaving is performed; and
setting the raw material flowing passage to the second raw material passage by the switch when peak shaving is not performed.

12. A hydrogen generation apparatus comprising:
a reformer which generates a hydrogen-containing gas by causing a reforming reaction of a raw material;
a first desulfurizer which removes a sulfur compound from the raw material by converting the sulfur compounds into hydrogen sulfide;
a second desulfurizer which removes a sulfur compound from the raw material by physical adsorption;
a first raw material passage through which the raw material that is supplied to the reformer not through the second desulfurizer but through the first desulfurizer flows;
a second raw material passage through which the raw material that is supplied to the reformer through the second desulfurizer flows;
a switch which selects one of the first raw material passage and the second raw material passage; and
a controller including a processor and a memory storing a control program,
wherein the control program, when executed by the processor, causes the controller to instruct the switch to select one of the first raw material passage and the second raw material passage based on an oxygen concentration in the raw material or information relating the oxygen concentration in the raw material.

13. The hydrogen generation apparatus according to claim 12, wherein the control program, when executed by the processor, causes the controller to instruct the switch to:
select the first raw material passage when the oxygen concentration in the raw material is less than a first value, and
select the second raw material passage when the oxygen concentration in the raw material is equal to or more than the first value.

14. The hydrogen generation apparatus according to claim 13, wherein
the control program, when executed by the processor, further causes the controller to instruct the switch to:
select the first raw material passage when a temperature of the first desulfurizer is less than a first threshold; and
select the second raw material passage when the temperature of the first desulfurizer is greater than or equal to a second threshold which is greater than or equal to the first threshold.

15. The hydrogen generation apparatus according to claim 13, wherein
the control program, when executed by the processor, further causes the controller to perform an operation of suppressing a temperature increase of the reformer after the selection of the second raw material passage.

16. The hydrogen generation apparatus according to claim 13, wherein
the control program, when executed by the processor, further causes the controller to control a temperature of the reformer to be higher than the temperature of the reformer in a case when the second raw material passage is selected than in a case when the first raw material passage is selected.

17. The hydrogen generation apparatus according to claim 13, wherein
the control program, when executed by the processor, further causes the controller to, after the selection of the second raw material passage, stop an operation when a temperature of the reformer becomes greater than or equal to a third threshold.

18. The hydrogen generation apparatus according to claim 13, further comprising an oxygen concentration detector which directly or indirectly detects the oxygen concentration in the raw material.

* * * * *